No. 669,603. Patented Mar. 12, 1901.
J. J. STAUFFACHER.
APPARATUS FOR STORING, COOLING, AND HANDLING FOOD STUFFS.
(Application filed Oct. 5, 1900.)
(No Model.)
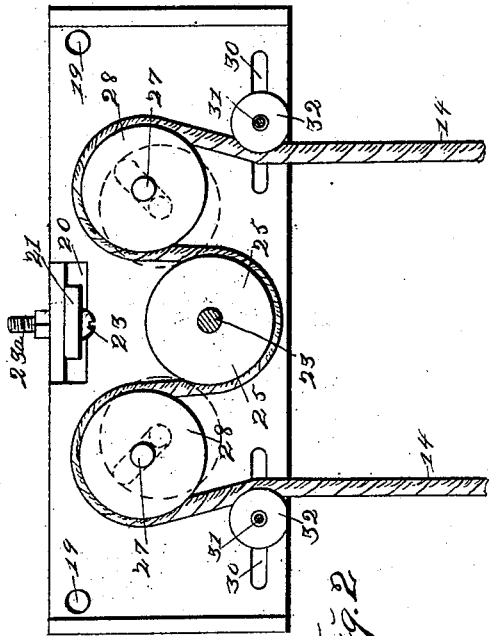
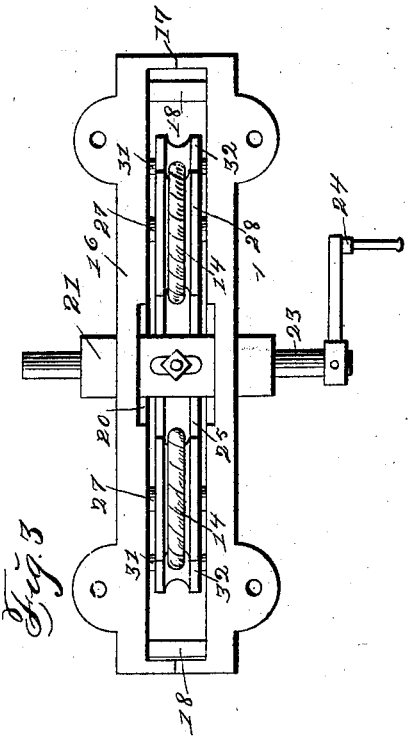
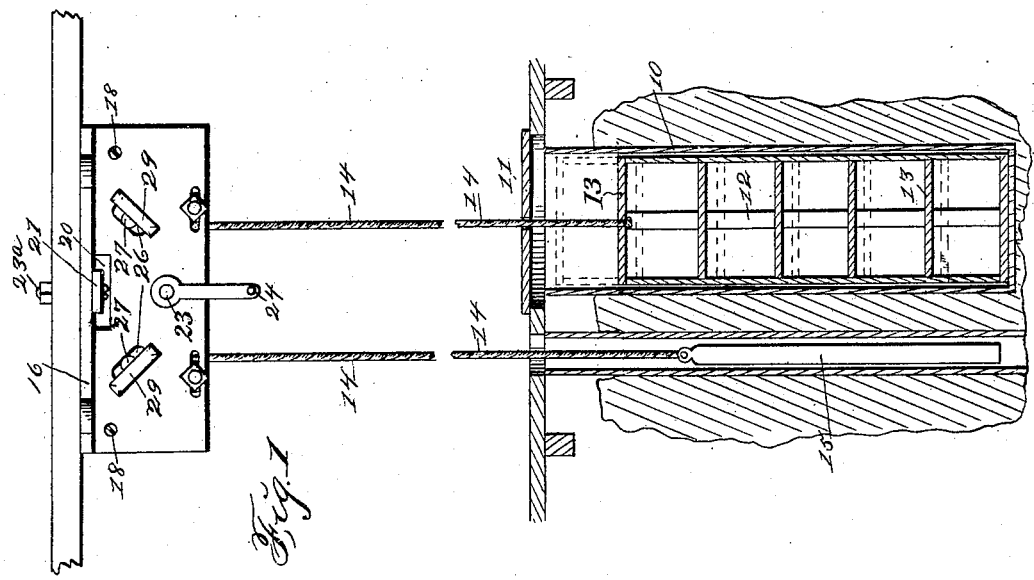

UNITED STATES PATENT OFFICE.

JOHN J. STAUFFACHER, OF ACKLEY, IOWA.

APPARATUS FOR STORING, COOLING, AND HANDLING FOOD-STUFFS.

SPECIFICATION forming part of Letters Patent No. 669,603, dated March 12, 1901.

Application filed October 5, 1900. Serial No. 32,101. (No model.)

*To all whom it may concern:*

Be it known that I, JOHN J. STAUFFACHER, a citizen of the United States, residing at Ackley, in the county of Hardin and State of Iowa, have invented a new and useful Apparatus for Storing, Cooling, and Handling Food-Stuffs, of which the following is a specification.

One object of my invention is to provide a device adapted to take the place of ice-boxes and refrigerators, in which perishable foods may be placed and lowered into a water-tight tube sunk in the ground and in which a carrier can be operated advantageously for storing foods where they may be cooled and preserved, and, further, to provide a carrier or case specially adapted for storing food so it can be easily and quickly elevated from the tube to gain access thereto and automatically held in any position without the use of ratchets or equivalent devices, even if the weight of the case containing the food exceeds that of the counterbalancing-weight.

A further object is to provide a device of simple, durable, and inexpensive construction, whereby the case containing the food may be conveniently and easily operated, the position of the ropes for supporting the case and the counterbalancing-weight readily and quickly adjusted to positions in alinement with the openings provided for them, and a certain amount of friction automatically applied to the ropes when the operating-lever is released or its movements stopped, which resistance will be sufficient to support the case in any position within the limit of its movement.

My invention consists in certain details in the construction, arrangement, and combination of the various parts of the apparatus, whereby the objects contemplated are attained, as hereinafter more fully set forth, pointed out in my claim, and illustrated in the accompanying drawings, in which—

Figure 1 shows a side elevation of the supporting and operating means and a sectional view of the case in which the food is contained placed in position within a well or opening in the ground. Fig. 2 shows a side elevation of the supporting and operating means with one side of the frame thereof removed and also by dotted lines showing the position of the brush-wheels as they would stand when brought close to the driving-wheel. Fig. 3 shows a top or plan view of the device for raising and lowering the case.

Referring to the accompanying drawings, I have used the reference-numeral 10 to indicate the tube to be placed in a well or opening in the ground. At the top of the tube is a loose cover 11, having a central opening, through which a rope may freely pass. The device for containing food comprises a series of upright strips 12, having circular horizontal shelves 13 attached thereto, upon which articles of food, &c., to be cooled and preserved may be placed. The case thus formed is designed to enter within the tube 10. A rope 14 is fixed to the top shelf 13 and is passed through an opening in the part 11. This part 11 is somewhat larger than the opening at the top of the tube, so that when the case is lowered the part 11 will remain on top of the opening and serve as a cover therefor, and when the case is raised this part 11 will move upwardly on top of the case. At the other end of the rope 14 is a counterbalancing-weight 15 in a tube adapted to conceal and guide the weight in its up-and-down movements.

The means for raising and lowering the case comprise a frame made of two plates 16, the ends of which abut at 17, thus leaving a space between the plates, and these plates are held together by means of the bolts 18, passed through the openings 19 in the plates. At the top of the plates 16 are integral laterally-projecting lugs perforated to admit screws, whereby the device may be supported from a ceiling or the like. Near the central portion of the plates, above the center thereof, are the slots 20, and I have provided means whereby the device may be supported in such a manner as to be capable of adjustment in any direction, as follows: A bar 21, of a length somewhat greater than the width of the frame, is passed through the slots 20, and this bar is provided with a longitudinal slot in its central portion. A bolt 23ª is then passed through this slot upwardly to enter a support presented horizontally. Obviously when the frame is supported in this manner it may be adjusted either longitudinally or transversely, so as to assume the desired position and be accurately centered over the well or opening into which the case is lowered. A short distance beneath the central portion of the frame I have rotatably mounted a shaft 23, having a crank 24 on its outer end and a peripherally-grooved wheel 25 on its central portion between the sides of the frame. In each side of the said frame I have provided two slots 26 to incline upwardly and outwardly from the said shaft 23, and these slots extend from points a short distance beyond the periphery of the wheel 25 to points some distance upwardly and outwardly therefrom. In each pair of these slots I have mounted an axle 27. Fixed to each axle is a wheel 28, having a grooved periphery. It is obvious that these wheels may move in a direction toward the central wheel 25. For limiting the longitudinal movement of the axles 27 I have provided the integral strips 29 on the outer surfaces of the plates 16 to overlap a portion of each axle, so that the axles may not move longitudinally.

Near the lower edge of the frame I have provided the horizontally-extending slots 30, and in each pair of slots is a round bolt 31, having a pulley 32, rotatably mounted on its central portion. By this arrangement it is obvious that these pulleys may be moved to any position within the limit of the slots and then firmly clamped in position by manipulating the nut on the bolt without affecting the rotary movement of the pulleys on the bolts.

In practical use it is obvious that the frame may be secured to a horizontal support and accurately adjusted to proper position over the well or opening into which the case is to be placed. Then the rope 14 is passed on the inner side of the first pulley 32, over one of the wheels 28, under the wheel 25, over the other wheel 28, and against the inner face of the remaining pulley 32. The position of these pulleys 32 is then adjusted as required to accurately center the case and the weight over the openings into which they are to descend. Assuming, further, that it is desired to raise the case, the crank 24 is turned, and obviously the case may be elevated to any position desired.

Having thus described my invention, what I claim, and desire to secure by Letters Patent of the United States therefor, is—

An apparatus for storing, preserving and handling food, comprising in combination, a frame 16, means for adjustably connecting the frame with an elevated support, a shaft, 23, rotatably mounted in said frame, a grooved wheel 25 on said shaft, two grooved wheels 28, rotatably mounted within the casing, to move in a direction upwardly and outwardly from the wheel 25, horizontally-adjustable pulleys 32 in said frame, a tube 10, a case comprising the upright strips 12 and the shelves 13 and adapted to move up and down in said tube, a cover 11, above the case, a rope fixed to the case and passed through the said cover and passed on the inner sides of the pulleys 32 over the wheels 28 and under the wheel 25, and a weight 15 attached to the other end of said rope, and a tube adapted to conceal and guide said weight, all arranged and combined for operation in the manner set forth, and for the purposes stated.

JOHN J. STAUFFACHER.

Witnesses:
 GEORGE D. LAMM,
 JOHN EGGERT.